R. E. ELLIS.
RESILIENT WHEEL.
APPLICATION FILED APR. 29, 1911.
1,014,644.
Patented Jan. 16, 1912.
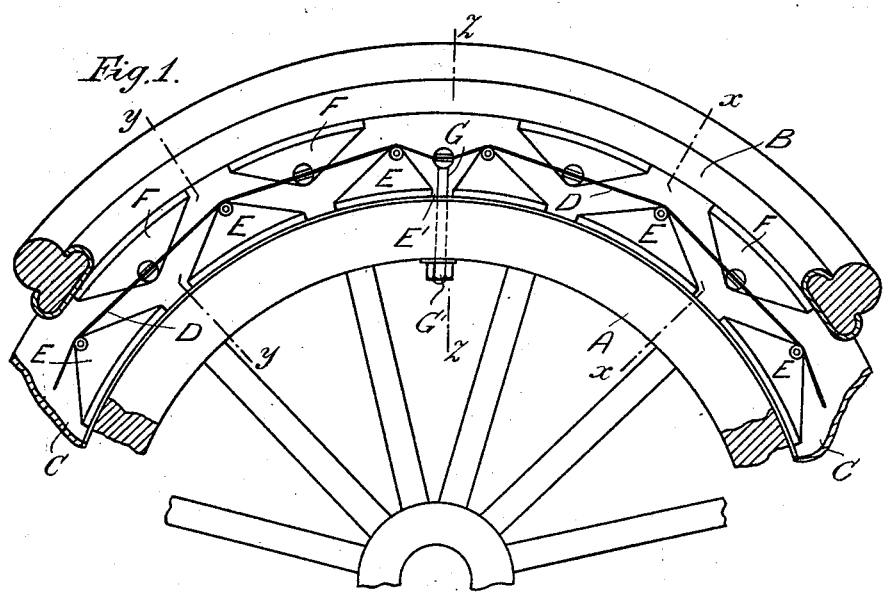
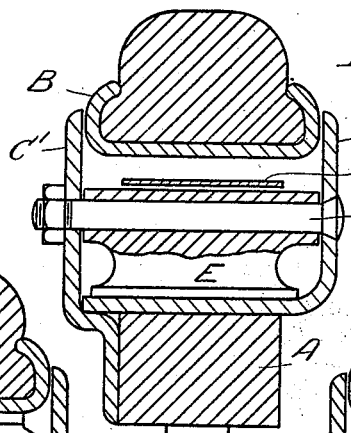
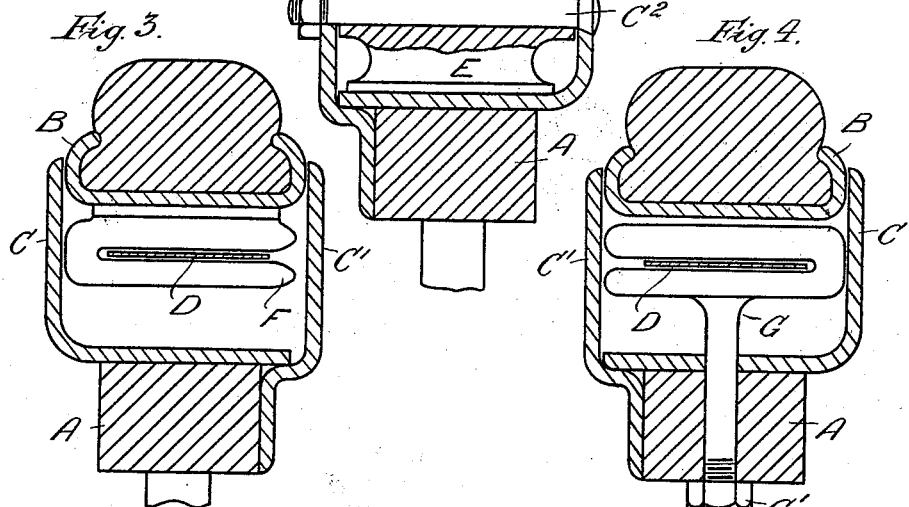
Witnesses—
Inventor—
Robert Elwood Ellis.

UNITED STATES PATENT OFFICE.

ROBERT ELWOOD ELLIS, OF RIDDRIE, GLASGOW, SCOTLAND.

RESILIENT WHEEL.

1,014,644.  Specification of Letters Patent.  Patented Jan. 16, 1912.

Application filed April 29, 1911. Serial No. 624,085.

*To all whom it may concern:*

Be it known that I, ROBERT ELWOOD ELLIS, a subject of the King of the United Kingdom of Great Britain and Ireland, and residing at Riddrie, Glasgow, Scotland, have invented a certain new and useful Improvement in Resilient Wheels, of which the following is a specification.

This invention relates to improvements in resilient wheels for motor cars and other vehicles and it consists in the combination of parts hereinafter particularly described.

In the accompanying drawings Figure 1 is an elevation of part of the improved construction of resilient wheel with one of the cheek plates removed: Figs. 2, 3 and 4 are cross sections, on an enlarged scale, on the lines $x$—$x$, $y$—$y$ and $z$—$z$, respectively, Fig. 1.

Referring to the drawings, the wheel comprises an inner wheel member or felly A of suitable material and an outer independent metallic or other rigid rim B preferably fitted with a tread of rubber or other material. The inner wheel member A has connected to it cheek plates C, $C^1$ to prevent lateral displacement of the rim B. The plate $C^1$ is detachably secured by means of bolts $C^2$ so as to permit the rim B and relative parts to be readily removed when desired. Between the rim of the wheel member A and the outer rim B is arranged an endless band D, preferably made of steel, said band being under tension and being supported at intervals by means of supporting members E disposed on the periphery of the wheel member A, while supporting members F, which are disposed on the inner periphery of the rim B and are arranged midway between the bracket members E, rest on said band D and thus support the rim B. Each of the members F has a slot, open at one side, which slot loosely receives the resilient band D. The open slots in the members F permit the band D to be entered laterally into said members and also permit the separable rim B, with its attached tire, to be readily removed when the cheek plate C is taken off, without disturbing said band. By preference, the supporting members F are adapted to engage both the outer and inner faces of the band D but are not rigidly attached thereto, a certain amount of vertical movement being permitted while the wheel is running. The tension of said band D may be regulated as by means of the slotted head of a bolt G engaging the band, said bolt, which is engaged by a nut $G^1$, being disposed between two of the bracket members E, as at $E^1$, Fig. 1, and being passed through the rim of the wheel A. Should the band D break, the inner wheel or felly A will rotate until the supporting members E and F, which are of tapered like formation, engage with each other in wedge-like fashion, whereby the rim B is maintained equi-distant from the center of the wheel, and a solid wheel effect is obtained.

Having now described my invention what I claim and desire to secure by Letters Patent of the United States is:—

1. A resilient wheel comprising, in combination, an inner wheel member or felly, a separable outer rim encircling said wheel member or felly, supporting members on said inner wheel member or felly, supporting members on said outer rim, each of said last mentioned supporting members having a slot open at one side, and a resilient endless band engaging both sets of said supporting members and adapted to be entered laterally into said slots, substantially as described.

2. A resilent wheel comprising, in combination, an inner wheel member or felly, a separable outer rim encircling said wheel member or felly, supporting members on said inner wheel member or felly, supporting members on said outer rim, each supporting member on the outer rim having a slot open at one side, a metallic endless band under tension adapted to be entered laterally into said slots, and means for regulating the tension of said endless band, substantially as described.

In testimony whereof I have signed my name to this specification in the presence of two subscribing witnesses.

ROBERT ELWOOD ELLIS.

Witnesses:
 WALLACE FAIRWEATHER,
 JOHN McCLEARY.